July 9, 1957  D. W. PRIDEAUX  2,798,943
SPOTLIGHT APPARATUS
Filed Oct. 20, 1955
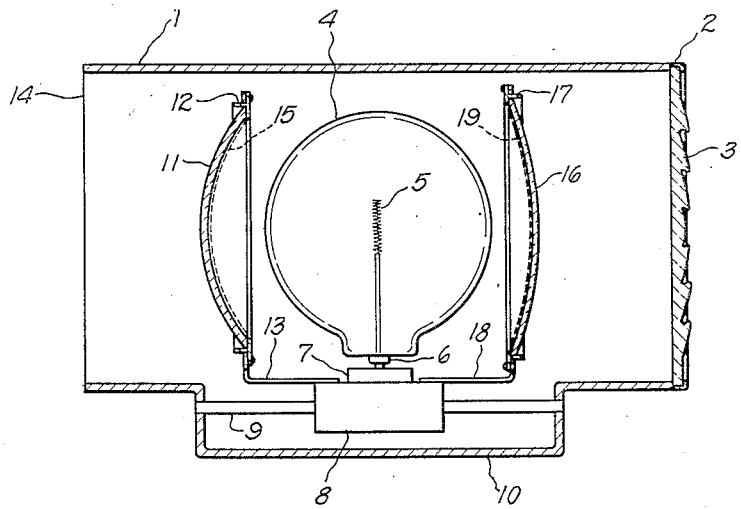
Inventor:
Donald W. Prideaux,
by Otto Tichy
His Attorney.

United States Patent Office 2,798,943
Patented July 9, 1957

2,798,943
SPOTLIGHT APPARATUS

Donald W. Prideaux, La Canada, Calif., assignor to General Electric Company, a corporation of New York Application October 20, 1955, Serial No. 541,793

2 Claims. (Cl. 240—47)

My invention relates to projection apparatus such as photographic spotlights.

The conventional spotlights require a light source, a lens or system of lenses to collect and redirect the light, a reflector to redirect light back through the light source to the lens system to increase the total light in the beam, and a housing designed to trap stray light and yet provide adequate ventilation. The light source may be an incandescent lamp of high intensity, particularly in large spotlights such as those used in movie studios. Inasmuch as the incandescent lamp, which may consume as much as 5000 or 10,000 watts, dissipates as much as 88–90% of the supplied electrical energy as infrared or heat rays, the beam projected by the spotlight contains a great deal of heat energy with attendant discomfort to the subject upon whom it is directed. Moreover, a great deal of heat is also trapped within the housing and is radiated therefrom with attendant discomfort to the operating personnel.

It is a principal object of the present invention to provide a spotlight structure wherein the heating effect of the beam is materially reduced, as well as the heating effect of the housing itself.

Accordingly, in accordance with one aspect of my invention, I provide means whereby the major part of the visible radiation from the light source is projected in one direction through the spotlight lens, whereas the major part of the infrared radiation is collected and projected in another direction exteriorly of the housing.

Further features and advantages of my invention will appear from the following description and from the drawing which is a somewhat diagrammatic elevation, in section, of a spotlight embodying the invention.

Referring to the drawing, the spotlight comprises a generally cylindrical housing 1 having a hinged door 2 at the front end thereof carrying a collecting lens 3 which may be of the conventional Fresnel type. Inside the housing is a light source herein illustrated as an incandescent lamp 4 which may be of the bipost type shown in Patents 1,967,852 and 2,098,080, D. K. Wright. The lamp contains a high intensity concentrated filament 5 connected to a pair of terminal posts 6 (only one of which is shown in part). The lamp is supported in a suitable socket 7 mounted on a carriage 8 which is mounted to slide along a pair of rods 9 (only one being shown) located in a well or depression 10 in the housing, whereby the lamp 4 may be adjusted longitudinally of the housing toward and away from the lens 3 for focusing purposes to vary the size of the beam projected through the lens.

A light-concentrating reflector 11 is mounted behind the lamp 4. The reflector 11 is preferably of spherical form with its center of curvature approximately at the center of the lamp filament 5 so that it reflects light back through the lamp and to the lens 3. The reflector 11 may be suitably mounted in a ring 12 supported by a bracket 13 from the carriage 8.

In accordance with one aspect of the present invention, the reflector 11 is constituted to be highly reflective of visible light rays and highly transmissive of infrared or heat rays, whereby the heat rays emitted rearwardly by the filament 5 are transmitted through the reflector 11. Moreover, the rear end of the housing 1 is provided with an opening 14 so that the infrared rays transmitted through the reflector to the rear of the housing are permitted to pass through the said opening and out into space.

Materials having the aforesaid property of reflecting light rays and transmitting infrared rays are per se known. For example, the reflector 11 may be made of glass or a suitable organic plastic composition coated with a dichroic filter indicated generally by the dotted line 15 and consisting of a film of a semi-conductor such as germanium, silicon, antimony sulphide, or selenium, coated with a thin film or films of a dielectric material or materials of such thicknesses or indexes of refraction as to minimize the reflectance for those wavelengths of the infrared which are near the region of most copious emission of the incandescent filament and/or maximize the visible reflectance. The dielectric films may consist of materials such as zinc sulphide, magnesium fluoride, aluminum oxide, magnesium oxide, etc.

One such coating 15 may be composed of a film of a semi-conductor such as germanium, silicon, antimony sulphide or selenium and a single film of dielectric, such as zinc sulphide, covering the semi-conductor and of such thickness as to reduce the infrared reflectance. The film of dielectric should have an optical thickness equal to one-quarter the wavelength of near infrared light (i. e., 900–1500 millimicrons) and an index of refraction equal to the square root of the index of refraction of the semi-conductor in this same wavelength region. More specifically, a glass reflector 11 may be coated with a layer of germanium of such thickness as to transmit approximately 20% of visible radiation, the germanium layer being coated with a layer of zinc sulphide having an optical thickness of approximately 250 millimicrons. Another type of reflector employing multiple coatings of pairs of dielectric films to increase the visible reflectance is disclosed in Patent 2,660,925, Turner.

In further accordance with the present invention, I provide means for intercepting and reflecting to the rear of the housing the infrared rays emitted from the filament 5 toward the lens 3. As herein illustrated, such means consists of a heat-directing reflector 16 located in front of the lamp 4 and supported from the carriage 8 by a suitable ring 17 and bracket 18. The said reflector 16 may be made of glass or a suitable organic plastic provided, preferably on its inner concave surface, with a dichroic film 19 having the property of being highly reflective of infrared rays and highly transmissive of visible light rays. Such films are also per se well known and may consist, for example, of extremely thin coatings of a metal such as gold, or of suitable sulphides. For further details of a suitable filter structure, reference may be had to Patents 1,342,984—Bugbee, 1,425,967—Hoffman, and 2,379,790—Dimmick.

The reflector 16 is of such contour as to collect and reflect infrared rays back through the opening 14. To this end, it is preferably of parabolic contour with its focus substantially at the center of the filament 5 so that infrared rays are reflected in a beam of substantially parallel rays back through the lamp 5 and the reflector 11 and out through the opening 14. Such an arrangement avoids concentration of heat at any one point on the glass bulb of the lamp 4 which might tend to result in blistering; it also prevents the reflected infrared rays from striking the housing 1.

It will be seen that I have provided means whereby the light rays emitted forwardly from the filament 5 are transmitted through the reflector 16 and through the lens 3 which collects and directs the light rays in a beam of the desired size and configuration. Light rays emitted from the filament 5 toward the rear of the housing are intercepted and reflected forwardly from the reflector 11 through the lamp 4, reflector 16 and lens 3. On the other hand, infrared rays emitted rearwardly from the filament 5 pass through the reflector 11 and outwardly of the housing 1 through the opening 14, whereas infrared rays projected forwardly from the filament 5 are intercepted by the reflector 16 and reflected rearwardly through the lamp 4 and reflector 11 and out through the opening 14. In this manner, not only is there a material reduction, at least 50%, in the amount of heat in the beam of visible light projected forwardly from the device, but there is likewise a very material reduction in the amount of heat radiated from the walls of the housing 1.

Moreover, by mounting both reflectors 11 and 16 on the carriage 8 together with the lamp 4, they are moved in unison with the lamp toward and away from the lens 3 for focusing purposes without disturbing the relationship between the reflectors and the lamp. Furthermore, by providing the heat-reflecting dichroic filter 19 on a separate lens 16, rather than on the surface of the collecting lens 3, I avoid increasing the cost of the lens element 3 which becomes an important consideration when the lens must be replaced due to accidental breakage which occasionally occurs.

What I claim as new and desire to secure by Letters Patent of the United States is:

1. A spotlight comprising a metallic housing having a lens over the front end thereof and an opening at the rear end thereof, a high intensity light source enclosed in said housing, a concave light-concentrating reflector enclosed in said housing behind said light source for reflecting light from said source forwardly through the light source to said lens, said reflector being constituted to be highly reflective of light rays from said source and highly transmissive of infrared rays, and a concave heat-concentrating reflector also enclosed in said housing in front of said light source and constituted to be highly transmissive of light rays and highly reflective of infrared rays and optically aligned to reflect said infrared rays rearwardly of the housing through the said light-concentrating reflector and through the said opening in the rear end of the housing.

2. A spotlight comprising a metallic housing having a lens over the front end thereof and an opening at the rear end thereof, a high intensity light source enclosed in said housing, a concave light-concentrating reflector enclosed in said housing behind said light source for reflecting light from said source forwardly through the light source to said lens, said reflector being constituted to be highly reflective of light rays from said source and highly transmissive of infrared rays, and a concave heat-concentrating reflector also enclosed in said housing in front of said light source and constituted to be highly transmissive of light rays and highly reflective of infrared rays and optically aligned to reflect said infrared rays rearwardly of the housing through the said light-concentrating reflector and through the said opening in the rear end of the housing, and means mounting said light source and both said reflectors as a unit and for adjustment along the interior of said housing toward and away from said lens.

References Cited in the file of this patent

UNITED STATES PATENTS

| | | |
|---|---|---|
| 2,287,328 | Rose | June 23, 1942 |
| 2,552,185 | Koch | May 8, 1951 |
| 2,660,925 | Turner | Dec. 1, 1953 |